US008576780B2

(12) United States Patent
Vujcic (10) Patent No.: US 8,576,780 B2
(45) Date of Patent: Nov. 5, 2013

(54) RANDOM ACCESS RESPONSE PROCESSING (75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 13/203,971

(22) PCT Filed: Nov. 12, 2009

(86) PCT No.: PCT/KR2009/006648
§ 371 (c)(1),
(2), (4) Date: Aug. 30, 2011

(87) PCT Pub. No.: WO2010/110522
PCT Pub. Date: Sep. 30, 2010

(65) Prior Publication Data
US 2012/0002606 A1   Jan. 5, 2012

Related U.S. Application Data (60) Provisional application No. 61/162,324, filed on Mar. 22, 2009.

(51) Int. Cl.
*G01R 31/08* (2006.01)
(52) U.S. Cl.
USPC .......................................... 370/328; 370/329
(58) Field of Classification Search
None
See application file for complete search history.

(56) References Cited

U.S. PATENT DOCUMENTS

| 6,480,525 | B1* | 11/2002 | Parsa et al. ..................... 375/141 |
| 2008/0181250 | A1 | 7/2008 | Koski |
| 2009/0316638 | A1* | 12/2009 | Yi et al. ......................... 370/329 |
| 2012/0002606 | A1* | 1/2012 | Vujcic ............................ 370/328 |

FOREIGN PATENT DOCUMENTS

| KR | 1020080036493 | 4/2008 |
| KR | 1020080039818 | 5/2008 |
| WO | 2008/097023 | 8/2008 |

* cited by examiner

*Primary Examiner* — Robert Wilson
(74) *Attorney, Agent, or Firm* — Lee, Hong, Degerman, Kang & Waimey

(57) ABSTRACT

The invention relates to a method of and an apparatus for processing a random access response, the method comprising the steps of: transmitting a random access preamble; receiving a random access response within a random access response time window; checking an extension field flag of the random access response; checking if the random access response matches the random access preamble; wherein if the random access response does not match the random access preamble and if the extension field flag is set to zero, the random access response reception is considered as unsuccessful and a further random access preamble is transmitted.

8 Claims, 7 Drawing Sheets

RANDOM ACCESS RESPONSE PROCESSING

CROSS-REFERENCE TO RELATED APPLICATIONS

This application is a 371 U.S. national stage application of International Application No. PCT/KR2009/006648, filed on Nov. 12, 2009, which claims priority U.S. Provisional Application Ser. No. 61/162,324, filed on Mar. 22, 2009, the contents of which are incorporated by reference herein in their entirety.

FIELD OF THE INVENTION

The present invention relates to a random access channel (RACH) procedure in a cellular communications network, and in particular to a method and apparatus for processing a random access response. While it is described below in the context of a long term evolution (LTE) type or an advanced long term evolution (LTE-A) type cellular network for illustrative purposes and since it happens to be well suited to that context, those skilled in the art will recognise that the invention disclosed herein can also be applied to various other types of cellular networks.

Discussion Of The Related Art

A universal mobile telecommunications system (UMTS) is a 3rd Generation (3G) asynchronous mobile communication system operating in Wideband Code Division Multiple Access (WCDMA) based on a European standard known as Global System for Mobile Communications (GSM), and general packet radio services (GPRS). The LTE of UMTS is under discussion by the 3rd generation partnership project (3GPP) that standardised UMTS.

3GPP LTE is a technology for enabling high-speed packet communications. Many schemes have been proposed for the LTE objective including those that aim to reduce user and provider costs, improve service quality, and expand and improve coverage and system capacity. 3G LTE requires reduced cost per bit, increased service availability, flexible use of a frequency band, a simple structure, an open interface, and adequate power consumption of a terminal as an upper-level requirement.

Figure 1:
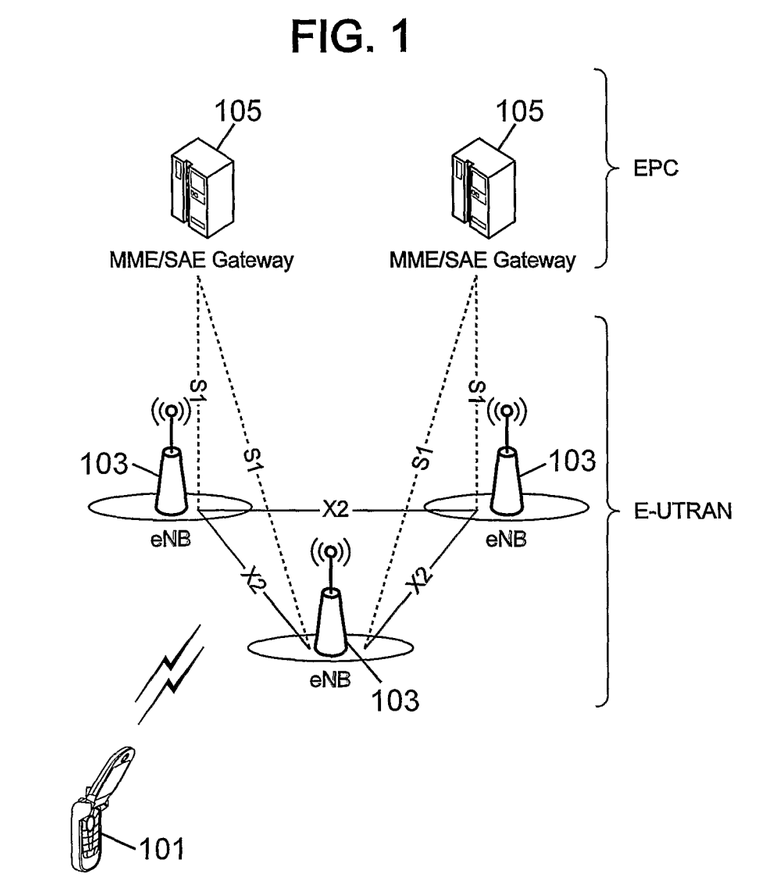
FIG. 1 is a block diagram illustrating network structure of an E-UTRA (or LTE) system.

FIG. 1 is a block diagram illustrating a network structure of an evolved universal terrestrial access system (E-UTRA). The E-UTRA may be also referred to as an LTE system. The communication network is widely deployed to provide a variety of communication services such as voice and packet data.

As illustrated in FIG. 1, the E-UTRA network includes an evolved terrestrial radio access network (E-UTRAN) and an evolved packet core (EPC) and one or more user equipments (UEs) 101. The E-UTRAN may include one or more evolved NodeBs (eNodeB, or eNB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with a UE 101, and may also be referred to as a base station (BS), a network entity or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

Figure 2A:
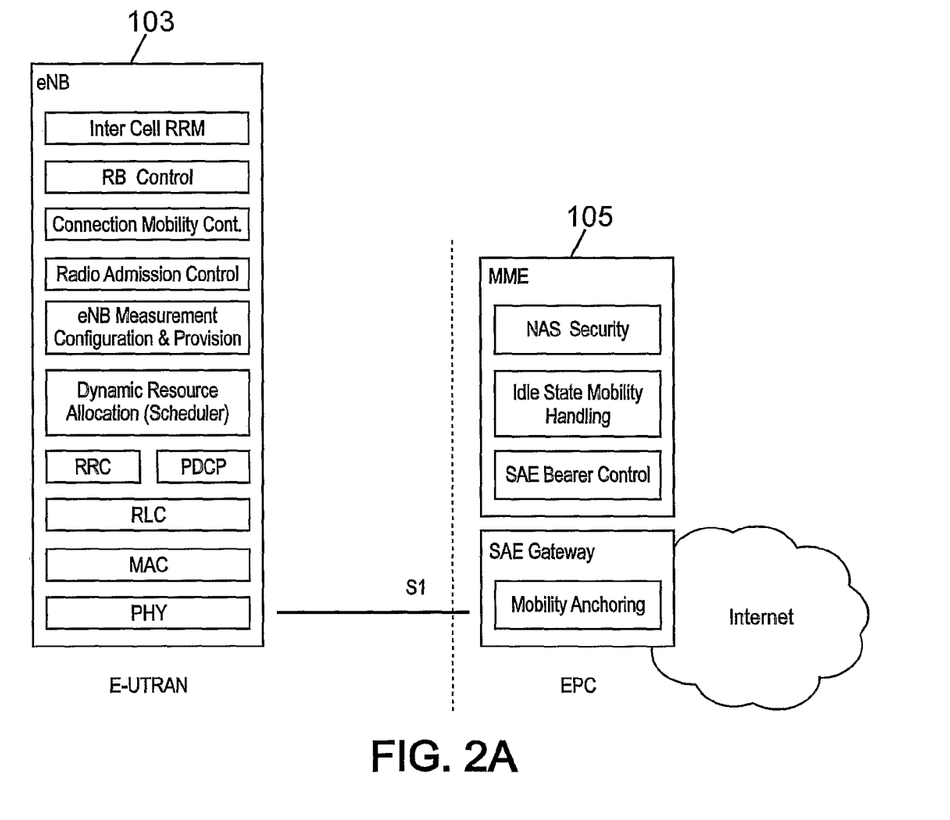
FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

FIG. 2(a) is a block diagram depicting architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

Figure 2B:
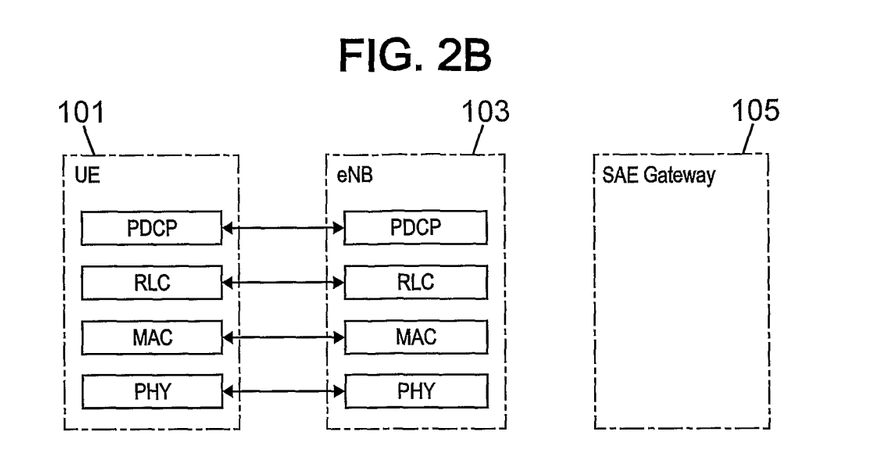
Figure 2C:
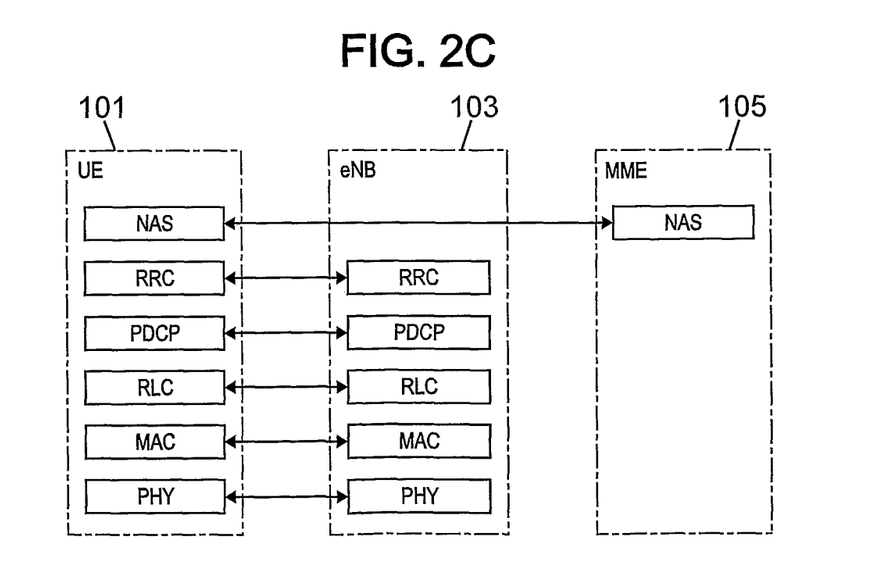

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where a UE sends a first message to a network is commonly referred to as initial access. In most systems the initial access is initiated by a UE transmitting a connection request message including the reason of the request, and receiving an answer from the network indicating the allocation of radio resources for the requested reason.

In 3GPP TS 25.331 there are several reasons, referred to as establishment causes, for sending a connection request message. Establishment causes include: originating conversational/streaming/interactive/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

An "originating call" establishment indicates that the UE 101 wishes to setup a connection, for instance a speech connection. A "terminating call" establishment indicates that the UE 101 answers to paging. A "registration" establishment indicates that the user wants to register only to the network.

To initiate access to the network a random access procedure is used. The physical random access transmission is under the control of higher layer protocol which performs some important functions related to priority and load control. These procedures differ in detail but GSM, UMTS and LTE radio systems have some similarities between them.

In the random access procedure the UE 101 randomly selects an access resource and transmits a RACH preamble to the network. A preamble is a short signal that is sent before the transmission of the RACH connection request message. The UE 101 can repeatedly transmit the preamble by increasing the transmission power each time the preamble is sent until the network indicates the detection of the preamble. The message part can then be sent at the level of power equal of the last preamble transmission power plus an offset signalled by the network.

A random access channel (RACH) is a common physical channel dedicated to the random access procedure. Uplink transmissions are generally initiated through a RACH. A UE sending data on a RACH has not yet been identified by the target eNB. RACH is typically an uplink common channel used for transmitting control information and user data. It is applied in random access, and used for low-rate data transmissions from the higher layer. Such a channel is said to be contention-based since many users can attempt to access the same base station simultaneously, leading to collisions. A RACH channel can be used for several purposes. For example the RACH can be used to access the network, to request resources, to carry control information, to adjust the time offset of the uplink in order to obtain uplink synchronisation, to adjust the transmitted power, etc.

A random access procedure can be launched by the UE or the eNodeB. It may, for instance, be triggered by the following events:

a UE switches from power-off to power-on and needs to be registered to the network.

a UE is not time-synchronized with a eNodeB and starts transmitting data (for instance the user calls).

a eNodeB starts transmitting data to the UE but they are not synchronized (for instance the user receives a call).

a eNodeB measures a delay of the received signal from the UE (for instance the user is moving and has lost synchronization).

a UE is moving from one cell to another and needs to be time-synchronized with a different target eNodeB than the serving eNodeB it is registered to (handover).

Figure 3:
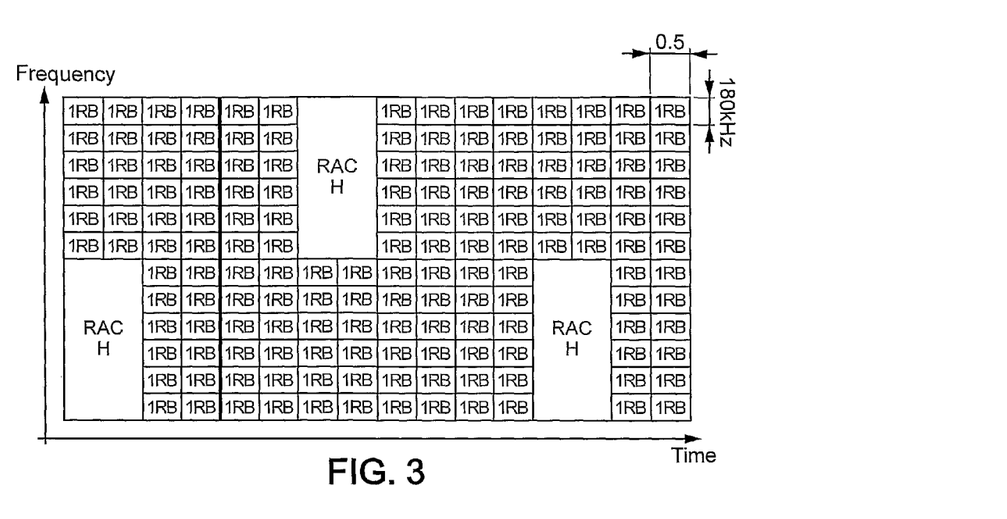
FIG. 3 graphically illustrates an example of the location of RACH slots in a 2.5 MHz bandwidth

In LTE, the basic unit of time is a slot (generally of a duration of 0.5 ms). Two slots make up a subframe and ten subframes constitute a radio frame. A random access channel typically occupies 6 resource blocks in a subframe or set of consecutive subframes reserved for random access preamble transmissions. A RACH period can be configured to be, for example, 1 ms, 2 ms, 5 ms and 10 ms. FIG. 3 shows one possible mapping of the RACH within a resource grid.

Figure 4:
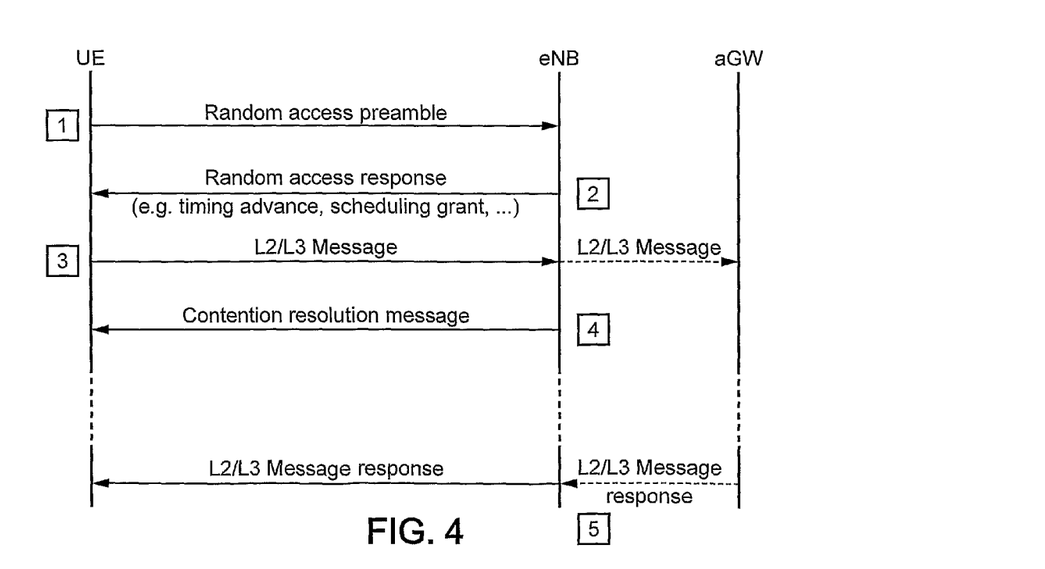
FIG. 4 is a diagram illustrating a typical RACH procedure FIG. 5 schematically illustrates a RACH preamble structure in E-UMTS

FIG. 4 illustrates an example of the sequences of messages and responses exchanged between a user equipment UE 101 and a base station eNB 103 in a typical RACH procedure.

Firstly the UE 101 retrieves information transmitted periodically from eNB 103 on a downlink broadcast channel (BCH). The received information includes the available preamble signatures in the cell, the location and period of RACH time slots; From the received information the UE 101 selects a preamble signature, a RACH time slot and a frequency band. The preamble signature is chosen by the UE 101 from among a set of preamble signatures known by the eNB 103. The UE 101 generates a single random access burst containing the chosen preamble signature and transmits it to the eNB 103 over the selected time slot at the selected frequency in message 1.

Figure 5:
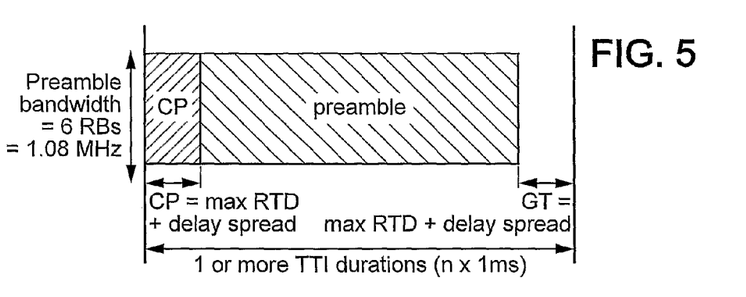

The random access burst consists of a cyclic prefix, a preamble, and a guard time during which nothing is transmitted as illustrated in FIG. 5. CP denotes cyclic prefix, GT denotes guard time, RTD denotes round trip delay and TTI denotes transmission time interval.

The preamble is sent before a RACH connection request and indicates that the UE is about to transmit data. The random access burst is transmitted during one subframe. While the UE is not synchronized in the time domain, its random access burst may overlap with the next subframe and generate interference. A guard time may thus be added to combat interference. The guard time (GT) should be at least equal to the round-trip delay at the cell edge.

During the random access procedure, several users share the same channel. They are distinguishable by virtue of orthogonal sequences. These sequences are seen as the UE preamble signatures that can be transmitted simultaneously. A collision occurs whenever several users choose the same signature and send it within the same time and frequency resources.

Preamble signatures should portray good autocorrelation properties in order for the eNodeB 103 to obtain an accurate timing estimation for a single preamble; and good cross correlation properties in order for the eNodeB 103 to obtain an accurate timing estimation for different preambles transmitted simultaneously by different UEs.

The Zadoff-Chu Zero Correlation Zone (ZC-ZCZ) sequences are used to fulfil these requirements. Each cell possesses a set of 64 signatures obtained from ZC-ZCZ sequences. The length of one sequence is N=839 samples. A ZC-ZCZ sequence is defined by two integers: u is the root index and v is the cyclic shift index.

In the time domain, the v-th cyclic shift is extracted from the u th root with:

$$x_{u,v}(n) = x_u(n + v \cdot N_{CS}) \ n = 0 \ldots N-1$$

where $N_{CS}$ is the cyclic shift length.

The u-th root sequence in the frequency domain is given by:

$$x_u(n) = e^{i\pi \cdot u \cdot \frac{n(n+1)}{N}}$$

The ZC-ZCZ sequences are used because they can generate a large number of sequences and they offer interesting correlation properties: the autocorrelation function shows no side peaks. The cross correlation between two sequences obtained from different roots is $\sqrt{N}$. Thus ZC sequences have zero-cross-correlation zones.

The eNB 103 monitors the current RACH slot in an attempt to detect preambles transmitted from UEs in the corresponding cell.

On reception of a signal the eNB 103 correlates the received signal in the RACH sub-frame with all possible signatures. Detection of the preamble can be either performed in the time domain or in the frequency domain. A detection variable is computed for each signature. If the detection variable exceeds a certain threshold, the preamble is considered detected.

The eNB 103 sends a random access response to acknowledge the successfully detected preambles in message 2. This message is sent on a dedicated downlink channel and uses the detected signature. It contains a timing advance command, a power-control command. If the procedure is contention-free then the UE and the eNodeB are thereby aligned in the time domain.

If the UE 101 receives a response from the eNB 103 the UE 101 decodes the response and adapts its transmission timing, and its transmission power if the response contains power control information. The UE 101 then sends a resource request message—message 3—on a dedicated uplink channel. In this message, the UE requests bandwidth and time resources to transmit data and it also indicates a UE-specific identifier. If the UE requests resources, the UE 101 uses a specific ID in the message to resolve contentions. Then the UE monitors a specified downlink channel for response from the eNB. In the case of a positive resource grant, the subsequent transmissions are carried out as normal.

The eNB attempts to resolve any contentions. If the eNB 103 receives a resource request with a UE-specific signature the eNB 103 checks how many UEs were detected with the same signature and resolves any possible contentions. If the preamble sent by UE 101 was in collision with a preamble from another UE, the eNB 103 sends a contention resolution message—message 4—to give the command to UE 101 to re-start the RACH procedure. If on the other hand the UE 101 was not in collision, the eNB sends a resource assignment message—message 5. In this case the subsequent transmissions are carried out as usual. The eNB 103 identifies the UE 101 and assigns resources according to the scheduling rules applied.

In the random access response, message 2, the UE may receive an ACK signal from the eNB to indicate that a message can be sent, a NACK signal indicating that the preamble was detected but a message cannot to be sent, or no response indicating that the preamble was not detected.

In the case where UE 101 receives no response indicating that a preamble has not been detected at the first attempt the UE 101 waits for the next RACH slot to send another preamble. The preamble signal-to-noise ratio (SNR) is relatively low compared to data SNR owing to the length of the zero-correlation sequences. Given that the random access channel does not generate much interference, the UE can afford to increase the transmission power by a few decibels (dB) at the second attempt to prevent consecutive failures (power ramping method). A too long delay is not desirable, especially in the case of handovers. The UE 101 repeatedly transmits the preamble by increasing the transmission power every time the preamble is sent until the network indicates the detection of the preamble. The procedure is exited after a certain number of failures. If a preamble is successfully transmitted the message part is generally sent at the level of power equal to the last preamble transmission power plus an offset signaled by the network.

When a random access preamble is sent by the UE, the random access response (RAR) sent by the eNB to the UE is expected to be received by the UE within a predefined reception time window. The UE will not terminate the RAR reception phase until a correct response message has been received or until a reception time window has elapsed. However, if the random access response does not contain the preamble identifier sent by the UE then in most cases UE waits until the end of reception time window for no useful purpose. Therefore the UE is delayed before triggering another preamble and as a result access latency is increased

SUMMARY OF THE INVENTION

According to a first aspect of the present invention there is provided a method of processing a random access response, the method comprising the steps of: transmitting a first random access preamble; receiving a first random access response within a random access response time window; checking if the first random access response matches the first random access preamble; wherein if the first random access response does not match the first random access preamble, the method further comprises checking an extension field flag of the first random access response to determine if the first random access response is the last random access response to be transmitted and if the extension field flag indicates that the random access response is the last random access response transmitted, transmitting a second random access preamble, otherwise awaiting a second random access response within the random access time window.

Accordingly RACH latency is reduced since the UE does not have to await the end of the response time window before retransmitting a RACH preamble.

According to a second aspect of the present invention there is provided a user equipment comprising: a transceiver for transmitting a random access preamble and for receiving a random access response within a random access response time window; a processor operable to check an extension field flag of the random access response and to check if the random access response matches the random access preamble; wherein if the processor determines that the random access response does not match the random access preamble and that the extension field flag is set to zero, the processor is further operable to determine that the random access response reception is unsuccessful and initiate transmission of a further random access preamble.

The methods according to the invention may be computer implemented. The methods may be implemented in software on a programmable apparatus. They may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION THE DRAWINGS

Embodiments of the invention will now be described, by way of example only, and with reference to the following drawings in which:—

FIG. 9A-B. schematically illustrate the structure of examples of a MAC sub-header FIG. 9C schematically illustrates the structure of an example of a MAC Random Access Response FIG. 10 schematically illustrates the structure of an example of a MAC header

DESCRIPTION OF PREFERRED EMBODIMENTS

Reference will now be made in detail to embodiments of the present invention, examples of which are illustrated in the accompanying drawings.

Embodiments of the present invention are directed to a RACH initial access procedure between a UE and an eNodeB.

Figure 6:
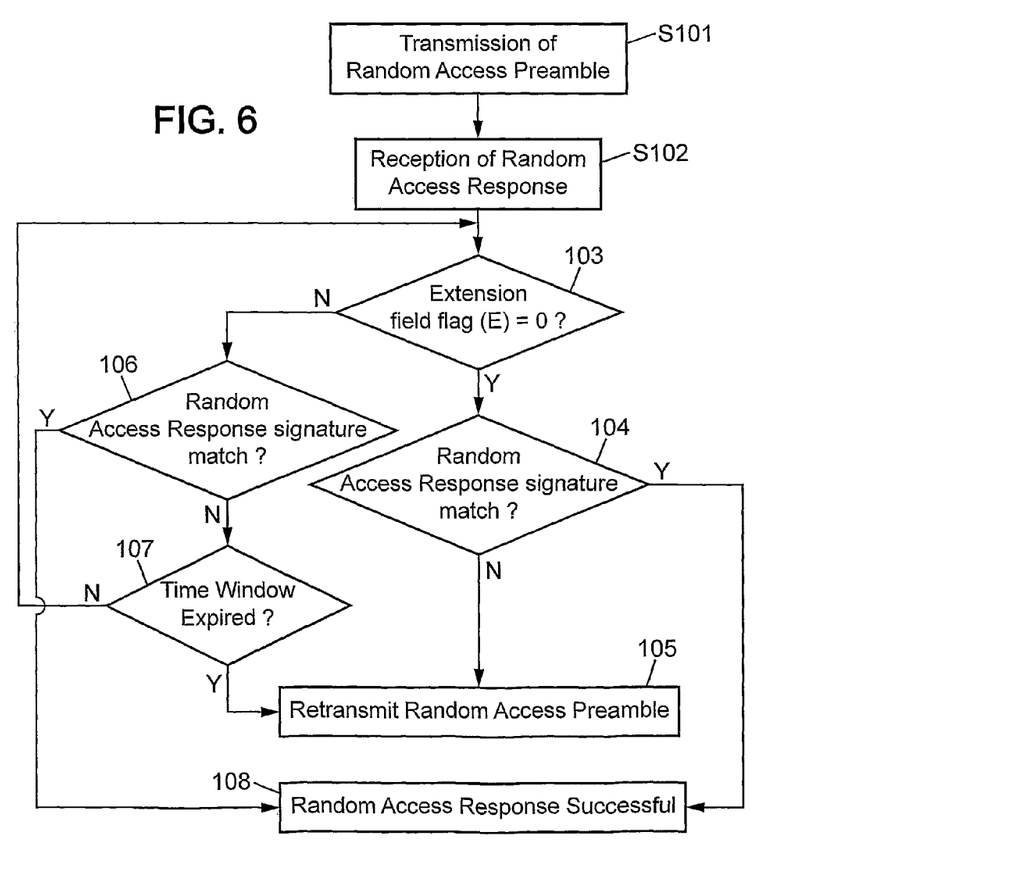
FIG. 6 is a flow chart illustrating a method of processing a random access response according to a first embodiment of the invention.

With reference to FIG. 6 in embodiments of the invention exchange of data between an UE 101 and eNodeB 103 enable eNodeB to be made aware of the transmission/reception capability of a UE.

FIG. 4 illustrates an example of a random access procedure between a user equipment UE 101 and a base station eNodeB 103 according to embodiments of the present invention.

As described above, the UE transmits a Random access preamble to the eNB in message 1 of the procedure prior to a RACH connection request. In the first embodiment of the invention with reference to FIG. 6 the random access preamble is sent from the UE in step S101.

The eNB responds to the preamble by sending a Random Access Response to the UE to acknowledge a successfully detected preamble in message 2. Message 2 may contain timing advance information, power control information and an initial uplink resource grant for transmission of the message 3. The random access response is received by the UE in step S102.

Figure 7:
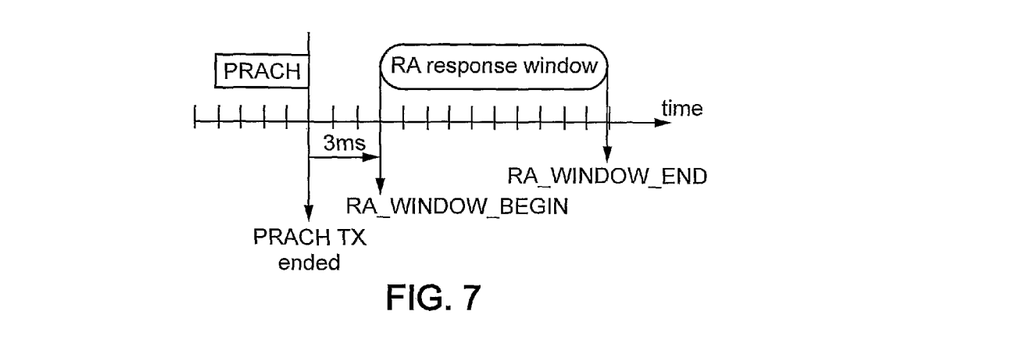
FIG. 7 is a graphical representation illustrating in the time domain the emission of a RACH preamble and a random access response time window FIG. 8. schematically illustrates the structure of an example of a MAC PDU including a MAC header and MAC RARs.

The random access response from the eNB is generally not synchronized with the transmission of the random access preamble from the UE. Typically, once the random access preamble is transmitted, the UE monitors the response from the network—the random access response—in the TTI window [RA_WINDOW_BEGIN-RA_WINDOW_END] which starts three subframes after the subframe that contains the end of the preamble transmission and has length of ra–ResponseWindowSize subframes configured by the network as illustrated in FIG. 7. For example, 2 ms≤ra–ResponseWindowSize≥10 ms).

Figure 8:
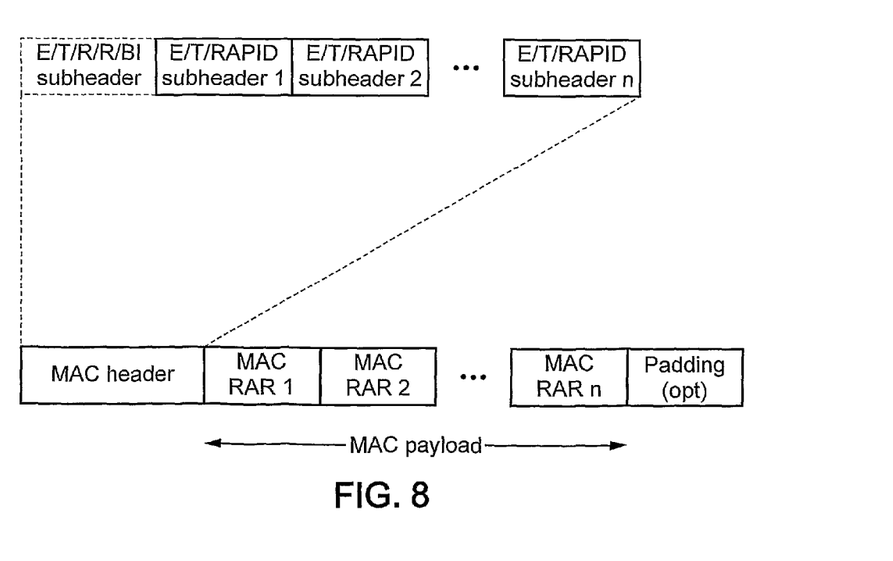

LTE RACH has been designed with the assumption of an operating collision probability of 1%. One RACH time-frequency slot (64 signatures) per 10 ms at 5 MHz can handle an offered load of 0.6432 average RACH attempts per RACH slot, which translates into 128 attempts/s at 10 MHz. This is considered as reference dimensioning scenario. As a consequence typically there is either no transmission or only 1 UE transmitting a preamble in the RACH opportunity. Although the specification allow a multiple response message to cover up to 64 preamble transmissions, analysis has shown that at high RACH load, up to 3 UEs may transmit RACH preambles. However, transmission by more than 3 UE is less likely. Therefore designs can, for example, be optimized to 3UE responses. The simultaneous response to the UEs can be contained in a single response message from the EnB. An example of a message structure including a plurality of responses is shown in shown in FIG. 8. Each UE decodes a MAC header by checking if one of the subheaders includes an echo of the preamble transmitted from that UE.

Figure 9:
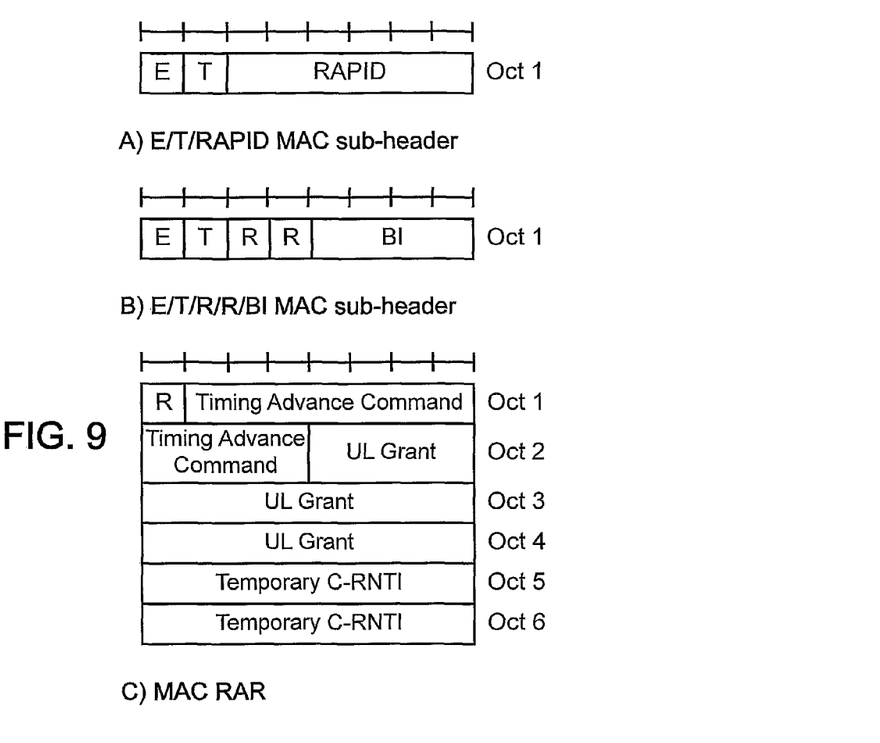

The baseline structure of random access response (message 2 in random access procedure of FIG. 4) is specified with a structure such for example as illustrated in FIG. 9.

The MAC header is of variable size and consists of the following fields:
 E: The Extension field is a flag indicating whether or not more fields are present in the MAC header. The E field is set to "1" to indicate another set of at least E/T/RAPID or E/T/R/R/BI fields. The E field is set to "0" to indicate that a MAC RAR starts at the next byte;
 T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);
 R: Reserved bit, set to "0";
 BI: The Backoff Indicator field identifies the overload condition in the cell. The size of the BI field is 4 bits;
 RAPID: The Random Access Preamble IDentitfier field identifies the transmitted Random Access Preamble. The size of the RAPID field is 6 bits.

Figure 10:
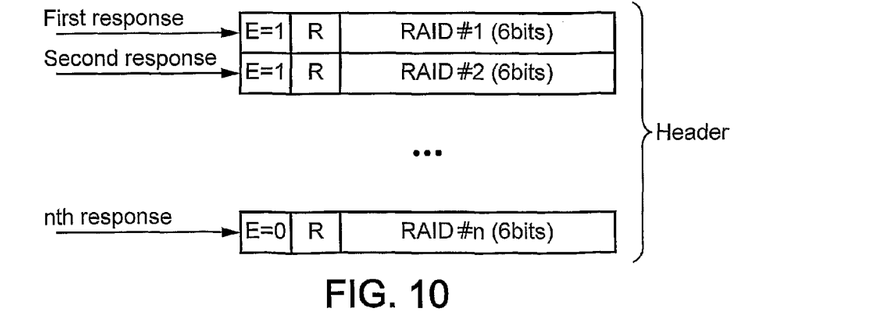

On reception of a random access response RAR, in step S103, the UE checks the extension field of the first MAC sub-header. Each byte of the header gives an index of an observed preamble as illustrated in FIG. 10.

If the extension field flag E of the sub header indicates 0 the UE proceeds in step S104 to check the identifier of the RAR sub header in order to see if the identifier matches the identifier of the transmitted preamble.

If the identifier of the sub header of the random access response matches that of the preamble transmitted by the UE the UE determines that the random access response to the transmitted preamble is successful in step S108 and the random access process is completed.

Otherwise if in step S104 the random access response does not match the preamble transmitted by the UE, the UE proceeds in step S105 to the preamble retransmission. Thus by checking the extension field flag E and determining that no more fields are to be transmitted by the eNB, the UE does not need to wait for the end of the RA response window and proceeds to preamble retransmission earlier thereby reducing random access latency.

If on the other hand in step S103 the extension field flag of the first sub header is set at 1, the UE proceeds in step S106 to check if the identifier of the random access response matches the identifier of the transmitted preamble. If yes the random access response is deemed as successful in step S108 and the random access process is completed. If in step S106 it is determined that the random access response does not match the transmitted preamble and the response time window has not expired S107 the process returns to step S103 and the UE continues to check the extension field flag of subsequent subheaders representing subsequent responses to preambles received by the eNodeB to verify if it is set at 0 or 1.

If in step S107 the time window for receiving a response from the eNodeB has expired the process continues to step S105 and a preamble is retransmitted from the UE.

If no Random Access Response is received within the TTI window [RA_WINDOW_BEGIN-RA_WINDOW_END], or if all received Random Access Responses contain Random Access Preamble identifiers that do not match the transmitted Random Access Preamble AND the extension field is set to "0", the Random Access Response reception is considered unsuccessful and the UE shall:
 increment PREAMBLE_TRANSMISSION_COUNTER by 1;
 If PREAMBLE_TRANSMISSION_COUNTER= PREAMBLE_TRANS_MAX+1:
 indicate a Random Access problem to upper layers.
 if in this Random Access procedure, the Random Access Preamble was selected by MAC:
  based on the backoff parameter in the UE, select a random backoff time according to a uniform distribution between 0 and the Backoff Parameter Value;
  delay the subsequent Random Access transmission by the backoff time;
 proceed to the selection of a Random Access Resource Embodiments of the invention enable a UE to determine if a random access response received from a network is the last response to received preambles be transmitted by the network. Such methods enable access latency to be reduced since the UE is not required to wait until the end of the response reception time window before retransmitting a preamble in the case where a random access response echoing the preamble sent by the UE has not been received.

While embodiments of the present invention has been hereinbefore described in relation to the illustrative case of a 3GPP LTE or LTE-A system, those skilled in the wireless communication art will appreciate that the invention is applicable to communications systems other than 3GPP LTE or LTE-A systems.

It will be appreciated that in an alternative embodiment of the invention the step of verifying if the random access response identifier matches that of the transmitted preamble may be carried out before the extension field is checked. In this case if the random access response identifier matches that of the transmitted preamble the random access response is determined as indicated success and the random access procedure is completed. If the random access response identifier does not match that of the transmitted preamble then the extension field is checked if the random access response time window has not expired. If the extension field is set at 0 a preamble is retransmitted, otherwise the preamble identifier of a subsequent response field is verified.

Many further modifications and variations will suggest themselves to those versed in the art upon making reference to the foregoing illustrative embodiments, which are given by way of example only and which are not intended to limit the scope of the invention, that being determined solely by the appended claims.

The invention claimed is:

1. A method of processing a random access response, the method comprising:
 transmitting a random access preamble;
 receiving a random access response within a random access response time window, the random access response comprising a random access identifier (ID) and an extension field flag;
 checking the random access identifier and the extension field flag of the random access response; and deeming a reception of the random access response as unsuccessful and retransmitting the random access preamble if the random access identifier does not match the random access preamble and the extension field flag is set to zero.

2. The method according to claim 1, wherein retransmitting the random access preamble is performed before an end of the random access response time window.

3. The method according to claim 1, wherein:
the random access response is included in a medium access control (MAC) packet data; and
a MAC header of the MAC packet data unit includes one or more sub-headers that include the random access identifier and the extension field flag.

4. The method according to claim 3, wherein:
the random access identifier corresponds to the random access preamble; and
the extension field flag indicates a presence of more sub-headers.

5. A User Equipment, comprising:
a transceiver configured to transmit a random access preamble and to receive a random access response, the random access response received within a random access response time window and comprising a random access identifier (ID) and an extension field flag; and
a processor configured to:
check the random access identifier and the extension field flag of the random access response; and
deem a reception of the random access response as unsuccessful and retransmit the random access preamble if the random access identifier does not match the random access preamble and the extension field flag is set to zero.

6. The User Equipment according to claim 5, wherein the processor is further configured to retransmit the random access preamble before an end of the random access response time window.

7. The User Equipment according to claim 5, wherein:
the random access response is included in a medium access control (MAC) packet data unit; and
a MAC header of the MAC packet data unit includes one or more sub-headers
that include the random access identifier and the extension field flag.

8. The User Equipment according to claim 7, wherein:
the random access identifier corresponds to the random access preamble; and
the extension field flag indicates a presence of more sub-headers.

* * * * *